United States Patent
Xiong et al.

(10) Patent No.: US 10,735,814 B2
(45) Date of Patent: *Aug. 4, 2020

(54) EXTRACTING MEDIA CONTENT FROM SOCIAL NETWORKING SERVICES

(71) Applicant: SONY INTERACTIVE ENTERTAINMENT LLC, San Mateo, CA (US)

(72) Inventors: True Xiong, San Diego, CA (US); Charles McCoy, Coronado, CA (US); Ling Jun Wong, Champaign, IL (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/442,724

(22) Filed: Jun. 17, 2019

(65) Prior Publication Data

US 2019/0306573 A1    Oct. 3, 2019

Related U.S. Application Data

(63) Continuation of application No. 13/433,827, filed on Mar. 29, 2012, now Pat. No. 10,327,032.

(51) Int. Cl.
*H04N 21/458* (2011.01)
*H04N 21/442* (2011.01)
(Continued)

(52) U.S. Cl.
CPC ..... *H04N 21/458* (2013.01); *H04N 21/44222* (2013.01); *H04N 21/4788* (2013.01); *H04N 21/8586* (2013.01)

(58) Field of Classification Search
CPC ............. H04N 21/458; H04N 21/8586; H04N 21/4788; H04N 21/44222
See application file for complete search history.

(56) References Cited

U.S. PATENT DOCUMENTS 7,340,457 B1    3/2008    Killian
7,685,132 B2    3/2010    Hyman
(Continued)

FOREIGN PATENT DOCUMENTS

CN    101167066    4/2008
CN    102077192    5/2011
WO    2008143493    11/2008

OTHER PUBLICATIONS

Product Literature, Vizio 65" Class Theater 3D Edge Lit Razor LED LCD HDTV, Launch Date: Dec. 2010.
(Continued)

*Primary Examiner* — Soe Hlaing
(74) *Attorney, Agent, or Firm* — Mayer & Williams PC (57) ABSTRACT

Systems and methods are disclosed for extracting media content from social networking services and presenting the extracted content to an IPTV (Internet Protocol Television) user in a personalized and easy-to-consume manner. One or more feeds from social networking services that contain data pertaining to the user's social graph are monitored by a service in the IPTV domain for media content that meets preset criteria and preferences of the user. A social networking dashboard application is hosted in the IPTV environment and includes a user interface arranged with tools to enable the user to set preferences and specify tags that control various aspects of the media content extraction. The service can also monitor the social networking feeds in a real-time manner that enables creation of a knowledge base that is usable to present media content "trends" to the IPTV user.

17 Claims, 9 Drawing Sheets

(51) Int. Cl.
*H04N 21/4788* (2011.01)
*H04N 21/858* (2011.01)

(56) References Cited

U.S. PATENT DOCUMENTS

| | | | |
|---|---|---|---|
| 8,539,359 | B2 | 9/2013 | Rapaport |
| 8,712,319 | B2 | 4/2014 | Rosenberg |
| 8,713,646 | B2 | 4/2014 | Stuntebeck |
| 10,327,032 | B2 * | 6/2019 | Xiong .................. H04N 21/458 |
| 2002/0035685 | A1 | 3/2002 | Ono |
| 2002/0152463 | A1 | 10/2002 | Dudkiewicz |
| 2003/0185396 | A1 | 10/2003 | Asano |
| 2005/0027991 | A1 | 2/2005 | DiFonzo |
| 2007/0143376 | A1 | 6/2007 | McIntosh |
| 2007/0162945 | A1 | 7/2007 | Mills |
| 2007/0240180 | A1 | 10/2007 | Shanks |
| 2007/0250571 | A1 | 10/2007 | Griffin |
| 2008/0016177 | A1 | 1/2008 | Jin |
| 2008/0152305 | A1 | 6/2008 | Ziegler |
| 2008/0178242 | A1 | 7/2008 | Eyal |
| 2008/0195664 | A1 | 8/2008 | Maharajh |
| 2009/0009605 | A1 | 1/2009 | Ortiz |
| 2009/0249244 | A1 | 10/2009 | Robinson |
| 2010/0082725 | A1 | 4/2010 | Onishi |
| 2010/0332565 | A1 | 12/2010 | Al-Shaykh |
| 2010/0333142 | A1 | 12/2010 | Busse |
| 2011/0112975 | A1 | 5/2011 | McQueen |
| 2011/0238690 | A1 | 9/2011 | Arrasvuori |
| 2011/0296510 | A1 | 12/2011 | Hatlelid |
| 2011/0321100 | A1 | 12/2011 | Tofighbakhsh |
| 2012/0030586 | A1 * | 2/2012 | Ketkar ............... G06Q 30/0269 715/751 |
| 2012/0030587 | A1 | 2/2012 | Ketkar |
| 2012/0047219 | A1 | 2/2012 | Feng |
| 2012/0113264 | A1 | 5/2012 | Moshrefi |
| 2012/0117184 | A1 | 5/2012 | Liu |
| 2012/0131447 | A1 | 5/2012 | Park |
| 2012/0158713 | A1 | 6/2012 | Jin |
| 2012/0233640 | A1 | 9/2012 | Odryna |
| 2012/0278329 | A1 | 11/2012 | Borggaard |
| 2012/0278428 | A1 | 11/2012 | Harrison |
| 2012/0291070 | A1 | 11/2012 | Feng |
| 2013/0081084 | A1 | 3/2013 | Scheer |
| 2013/0174035 | A1 | 7/2013 | Grab |
| 2013/0262997 | A1 | 10/2013 | Markworth |

OTHER PUBLICATIONS

Yung-Hui Lim, 8 Excellent Tools to Extract Insights from Twitter Streams, Grey Review, Mar. 9, 2009.

Alberto Rosi et al., Social Sensors and Pervasive Services: Approaches and Perspectives, 2011 IEEE International Conference on Pervasive Computing and Communications Workshops (PerCom Workshops), Mar. 21-25, 2011, pp. 525-530.

* cited by examiner

EXTRACTING MEDIA CONTENT FROM SOCIAL NETWORKING SERVICES

BACKGROUND

Social networking websites have proliferated in popularity and can be expected to present opportunities to improve the user experience with IPTV (Internet Protocol Television) systems. While such IPTV systems work well in many situations, some systems presently tend to provide isolated, single user experiences that do not take full advantage of all the resources that are available in an increasingly connected world. It can be difficult for some IPTV users to make sense and determine the relevancy of all of the available media content. Although there are existing ways to add friends and share content and other assets in an IPTV environment, the experience can be disorganized and impersonal. Social networking applications and widgets have been developed for integration into the IPTV environment, but such tools can require a relatively large amount of user interaction to enter data and make updates to the social networking sites. Such interaction can be awkward and burdensome to IPTV users who are often looking to locate and consume personalized, relevant, and entertaining media content without having to work hard to do so.

SUMMARY

Systems and methods are disclosed for extracting media content from social networking services and presenting the extracted content to an IPTV user in a personalized and easy-to-consume manner. One or more feeds from social networking services that contain data pertaining to the user's social graph (e.g., friends, relatives, co-workers, groups, etc., and collectively referred to as "friends") are monitored by a service in the IPTV domain for media content that meets preset criteria and preferences of the user. A social networking dashboard application is hosted in the IPTV environment which can include a platform that is optimized for media content playback, such as an IPTV or other large television screen and/or on a home theater/audio system, as well as devices referred to as "second displays." The second displays serve as an additional control for the IPTV, but generally do not require additional investment by the user because the same make use of a device, e.g., a smartphone, laptop computer, tablet computer, desktop computer, an Internet appliance, etc., which most users would already have in their possession.

Media content assets which typically include a link to media content (e.g., video, audio, images, etc.) and related metadata such as a graphical icon or thumbnail representation of the content, content title, content size/length, date, user ratings, and the like are extracted from the monitored social network feeds and presented on a graphical user interface (UI) exposed by the social networking dashboard application running on either the IPTV, the second display, or both devices.

The UI is arranged with tools to enable the user to set preferences and specify tags that control various aspects of the media content extraction, for example, the frequency of the feed monitoring and content extraction, and to personalize the media content to the user. The UI may also be arranged to be user-configurable so that the media content assets are presented according to the user's particular specifications. For example, the size and shape of the UI window and how the personalized media content is presented (e.g., in a mosaic of thumbnails, a grid or list view, etc.) may be configured by the user.

The social networking dashboard application UI may be further configured to enable the user to browse and select media content for playback on the IPTV. The social networking dashboard application is typically configured with a networking communications module that enables two-way connectivity with one or more remote servers that are supported by the IPTV domain service provider. The remote server, responsively to the user's media content selection made using the social networking dashboard application, will fetch the selected media content and transmit the content to the user to consume locally on the IPTV, store for future consumption, or forward to another device.

In this way, media content is personalized to the user because it is extracted from sources identified by members of the user's social graph and conforms to the particular criteria specified by the user. Advantageously, the IPTV domain service (or, in alternative implementations, the social networking dashboard application or another locally executing application), monitors the social networking feeds automatically and in the background so that the IPTV user is presented with relevant and personalized media content choices any time the application is launched. In some instances the monitoring is performed continuously, while in others the monitoring is performed at intervals that may be determined by the service or specified by the IPTV user, for example by being expressed as a user preference. The user can then simply browse and select among the presented choices and consume the media content without having to make significant effort beyond the initial selection of the tags used as media content extraction criteria.

In another aspect of the present arrangement for media content extraction from social networking services, the IPTV domain service can monitor the social networking feeds in a real-time manner that enables creation of a knowledge base that is usable to present media content "trends" to the user. In this aspect, media content assets are streamed from the service provider to the social networking dashboard application in real-time or near real-time as the user's friends update their social networking pages with relevant media content. The relevancy of the media content is determined according to preferences that may be set by the user with tools exposed by the dashboard application UI. Such preferences can include, for example, context, subjects, ideas, topics, keywords, genres, and the like.

For example, a user preference may indicate interest in a particular college sports team. As the user watches a game on the user's IPTV, the social networking dashboard application will display trends that are indicative of the user's friend's social networking activities through the feeds that are related to the preference. As the game unfolds, one feed might contain a picture and comments about a team member who just made a key play in the game, a second feed might include a link to a video about the team member, while a third feed could include a link to an audio file of fans cheering for the team.

Because the service provider can monitor multiple feeds on a frequent basis, the trends can be continuously updated to reflect social networking activities as they occur. For example, if a car advertisement is shown during a commercial break in the televised game, a trend could show that the user's friends have shifted from game-related activities to those that pertain to the advertisement. Thus, a feed may contain photographs showing a car owned by one of the user's friends which can be extracted and shown or linked to in the displayed trend by the dashboard application. In this way the user can be conveniently kept up to date as to social networking trends of the user's friends.

The social networking dashboard application UI may be user-configurable to control how the trends are displayed and multiple preferences can be input to the service through the UI in typical applications. Utilization of multiple preferences can, in some instances, enable the trends to be even more personalized to a given user by functioning as either broadening or filtering criteria. For example, the user might specify the generation of trends which pertain to both a preference for the college sports team and a preference for automobiles. In another case, the user may specify that the trends be generated to deal with either a preference for a college sports team or a preference for automobiles. In the first case, the specification of the automobile preference functions to filter the displayed trends, while in the second case the specification of the automobile preference works to broaden displayed trends. Trends may further be broadened in scope by allowing a user to select his or her social networking friends' preferences as a preference.

The social networking dashboard application may be further configured to accept user feedback as to the accuracy and/or relevancy of the extracted media content and displayed trends. Such feedback may be useful to enable the IPTV domain service provider to adjust the social networking feed monitoring and content extraction processes to better suit the needs of a given user.

The present systems and methods may include a method for providing media content to a media content playback device associated with a user. The method may include a step of monitoring one or more social networking feeds to identify media content items that conform with user-defined criteria in which the user-defined criteria include tags or profile preferences. Another step of the method may include extracting identification of media content from the monitored social networking feeds when objects in the social networking feed match the profile preferences. Another step of the method may include sending the extracted identification as at least a portion of a media content asset to a device for display to the user. The media content asset may be expressed using XML (eXtensible Markup Language). The method may also include a step of providing data to the display so that a plurality of media content assets are arranged to indicate one or more trends to the user. Another step of the method may include causing the media content to be delivered to the media content playback device for consumption or storage in response to user selection of a displayed media content asset.

In other aspects of the method the monitored social networking feeds may be associated with various ones of the user's social graph in which the social graph includes one or more of friends, relatives, subscriptions, affiliations, groups, events, or co-workers, or the monitored feeds may be selected according to a user subscription.

In another aspect of the method, the causing of the media content to be delivered to the media content playback device may include causing the media content playback device to download the media content from a content server via a supplied URL/URI (Uniform Resource Location/Uniform Resource Identifier). In another aspect, the causing may include retrieving the media content from a content server or social networking server and transmitting the retrieved media content to the media content playback device.

In another aspect of the method, the extracting of the identification of media content from the monitored social networking feeds may be performed via interaction with an API exposed by a server operated on behalf of the social networking service provider.

In another aspect of the method, the profile preferences may be arranged hierarchically and at least one of the profile preferences may relate to a second profile preference via context or keyword.

The present systems and methods may include one or more non-transitory computer-readable storage media containing instructions which, when executed by one or more processors disposed in an electronic device, implement a social network dashboard application user interface that performs a method. The method may include a first step of supporting functionality through the user interface for receiving input from an application user that is indicative of tags or profile preferences usable as criteria for extracting media content from one or more social networking feeds. Another step of the method may include providing the input tags or profile preferences to a service that extracts media content from the one or more social networking feeds when the criteria are met. The method may also include a step of receiving a plurality of media content assets from the service. The media content assets may include identification of the extracted media content and related metadata.

An additional step of the method may include displaying the plurality of media content assets to the user. The media content assets may be arranged in the display in a manner that is indicative of one or more trends in the social networking feeds. In other aspects of the method, functionality may be provided for receiving user input for controlling aspects of the display of the plurality of media content assets. Such aspects of the display that may be controlled include selecting among alternative display arrangements for thumbnails that are representative of the media content. The alternative display arrangements may include mosaic, mesh, grid, categorization, and list.

In another aspect, functionality may further be provided through the user interface for receiving an indication from the user of a selection of a piece of media content and displaying the metadata associated with that media content or causing the media content to play back on a content playback device based on the user input. The user may also be provided with an ability to provide feedback as to the accuracy and relevancy of the displayed trends. The dashboard application may be hosted on an IPTV, second display, disc player, media player, networked media player, set-top-box, game console, home entertainment system, or an electronic device which incorporates a combination of the functionalities of these devices.

The present systems and methods may include a method for displaying media content extracted from a social networking service on a content playback device associated with a user. The method may include a step of monitoring activities of one or more members of the user's social graph on the social networking service with the monitoring being performed substantially continuously so as to capture social networking updates posted by the members in near real-time.

Additional steps of the method may include extracting media content contained in the social networking updates, adding the extracted media content to a queue of media content associated with past updates, and displaying the queued media content in the form of a trend to the user. Another aspect may include rejecting social networking updates that do not conform to pre-selected user preferences.

In another embodiment of the method, the pre-selected user preferences may be representative of at least one of context, keywords, topics, concepts, subject, or genre. The method may also include enabling the user to select media content in the queue for playback. In another aspect, a trend may indicate a degree of popularity, among users, of a given piece of media content. The degree of popularity may be determined according to a number of members consuming the given piece of media content, or according to a ranking ascribed to the given piece of media content by the members. Alternatively, the degree of popularity of the given piece of media content may be determined according to a degree of popularity of aspects of the media content among the members in which such aspects may include one or more keywords that pertain to the media content.

Advantages of certain embodiments of the invention may include one or more of the following. Ways are provided to extract media content from feeds from social networking services and present the extracted content in the IPTV domain. The extracted media content can be personalized to different users of the IPTV system and be presented in the form of trends. Extending the IPTV domain into popular social networking services can broaden the appeal of IPTV and significantly enhance the IPTV user experience.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
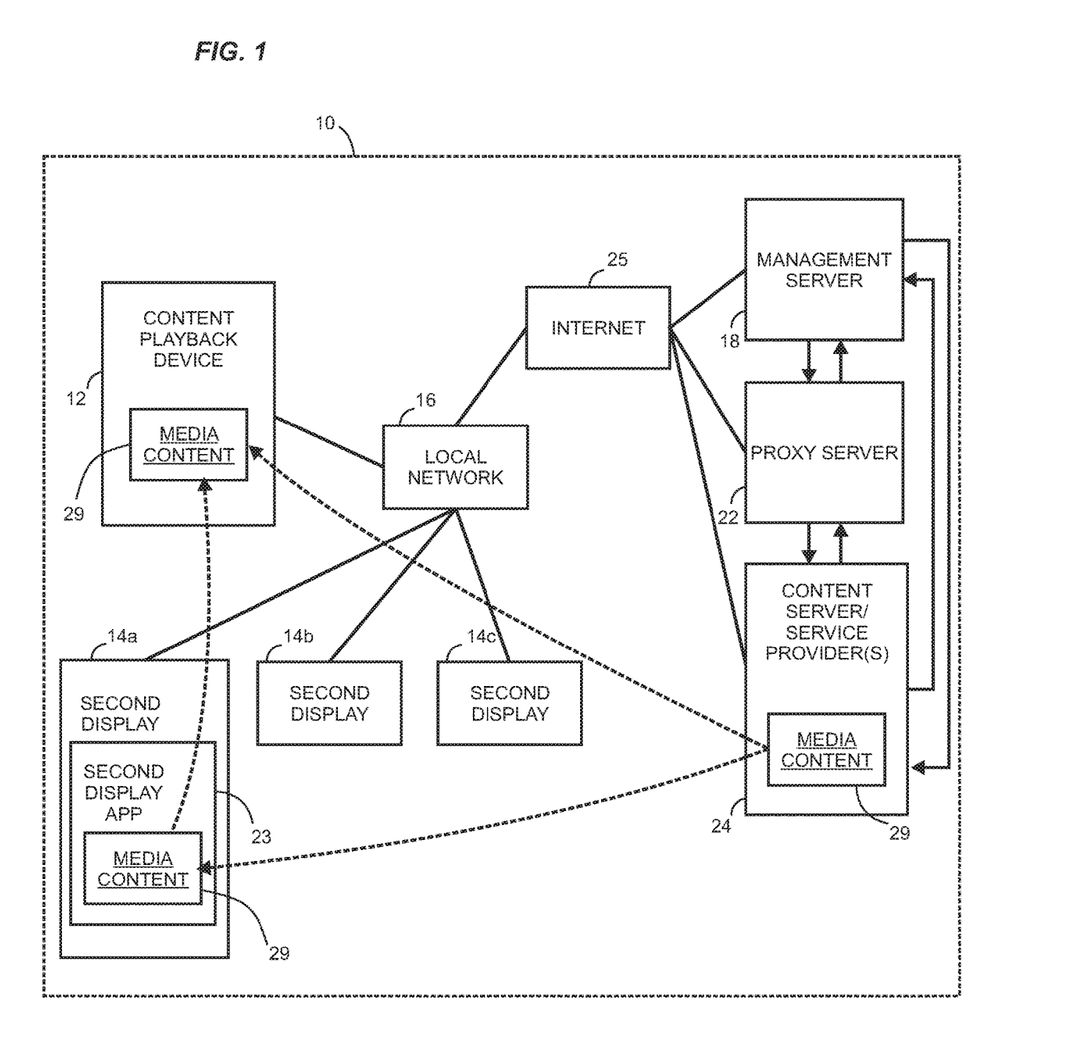
FIG. 1 is a block diagram of an exemplary system in accordance with one aspect of the present principles.

Referring initially to FIG. 1, a system 10 is shown including a content playback device 12 coupled to a local network 16, which may be wired, wireless, or a combination of both. Also coupled to the local network 16 are one or more second displays 14*a*-14*c*, an exemplary one of which is termed herein second display 14*i*, which runs a second display application 23. Second displays and their utilization in an IPTV environment are described in detail in co-pending U.S. patent application Ser. No. 13/077,181, filed Mar. 31, 2011, entitled "PERSONALIZED SECOND DISPLAY BROWSING EXPERIENCE DUE TO MULTIPLE SESSION FEATURE", owned by the assignee of the present application and incorporated by reference in its entirety. To control content playback device settings, a group of users may exploit individual "second displays" to control settings, view, browse, and navigate content or data service offerings, by service providers, e.g., Internet network services, on behalf of a content playback device, e.g., an IPTV, and then arrange for a selected content item or items to be played back on the content playback device.

The second displays are optionally utilized and typically serve as an additional control for the IPTV and are generally complementary to an IPTV because of the second display's strength in supported languages and character font sets, data entry, processing power, and user experience in content management.

Communications with service providers 24 may take place through a proxy server 22, and the proxy server will typically present the authentication credentials of the content playback device to service providers, so that the second displays appear to the service providers as an authenticated content playback device.

The second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, set-top-boxes (an information appliance that typically connects a television or other display device to a content provider such as a cable or satellite TV service provider), disc player, media player (which may be networked such as the Sony Netbox), home entertainment or home theater system, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

A number of servers may be accessed by the content playback device 12 and the second display 14*i* through the local network 16 and the Internet 25, including the management server 18, the proxy server 22, and one or more content servers 24 corresponding to service providers that can serve media content 29.

The management server 18, along with the content playback device 12, communicates with the content server 24 such that the server provides media content items for presentation of or access to the media content at the content playback device 12. The proxy server 22 communicates with the management server 18 and the second display 14*i*. In some cases, the proxy server 22 may be merged with the management server 18, or in other cases a separate proxy server may be provided for each content server or service provider. The content playback device 12 sends login information to the management server 18 which returns to the content playback device 12 a user token that must subsequently be presented by the content playback device 12 to the content server 24 to obtain content from the content server 24.

Figure 2:
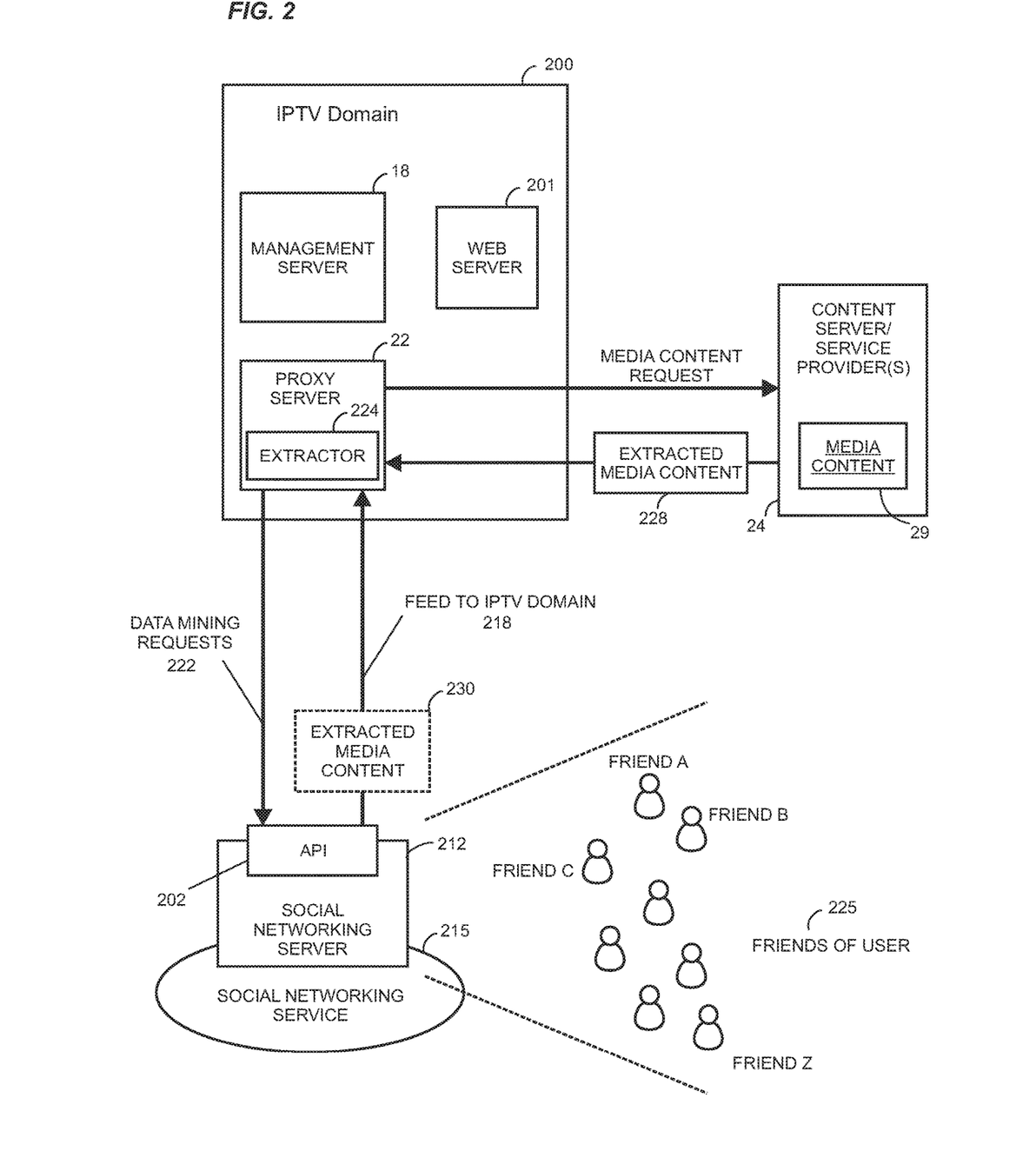
FIG. 2 is a block diagram of another exemplary system in accordance with an aspect of the present principles.

FIG. 2 shows an additional aspect of the present arrangement in which one or more servers 212 associated with a social networking service 215 are further operatively coupled to the management and proxy servers 18 and 22 in the IPTV domain 200. Also optionally disposed in the IPTV domain 200 is an exemplary web server 201 for serving web pages associated with the IPTV domain 200 when needed to supplement or replace functionality that may be provided by a dedicated social networking dashboard application (as described below). In other words, in some implementations, it may be desirable to support the present social network functionality through utilization of an application such as a web application that is typically configured using a web browser that is locally instantiated on either the content playback device 12 or second display 14*i*.

The servers 18 and/or 22 are arranged to monitor one or more social networking feeds (representatively indicated by a social networking feed 218) to the proxy server 22 that are exposed by a server 212 supported by a social networking service 215. The monitoring and extraction of certain media content is performed according to user-specified criteria as described in more detail in the description accompanying FIG. 3 below. In alternative implementations, the monitoring and extraction may be performed, in whole or part, using an application that executes locally on the content playback device 12 and/or a second display 14*i*.

The remote monitoring using the servers 18 and 22 may be utilized, for example, in those scenarios in which substantially continuous monitoring of the feeds, or relatively frequent monitoring of the feeds is implemented. The servers may be advantageously utilized in such scenarios as they are typically configured to operate continuously as compared to a local monitoring/extraction application executing on the content playback device or second display that can be turned off when not in use thus making continuous monitoring impossible in most cases.

The social networking feeds contain data that is representative of certain social networking activities of various friends 225 of an IPTV user. It is noted that while the term "friend" is used for the sake of convenience and clarity of exposition in the present description, the term is intended to have broad scope and encompass various persons, things, or entities that may be part of the user's social graph including subscriptions, affiliations, groups, events, and the like. In the exemplary arrangement shown in FIG. 2, the server 205 can typically expose an API 202 to enable the proxy server 22 (or the management server 18) and social networking server 212 to efficiently communicate with each other using conventional protocols. The feed 218 may be received in response to various data mining requests 222 generated by an extractor 224 that is disposed in the proxy server 22 that are presented to the API. Such receipt of data in response to a request is referred to here as a "data pull" scenario.

In an alternative arrangement, the monitoring may be implemented using a social networking feed that is pushed from an API or other interface at the social networking server 212 to a feed recipient. In this scenario, referred to as "data push", the pushed feed may be received by the servers 18 and/or 22, or the local IPTV server or second display in alternative scenarios. In one illustrative scenario, the pushed feed may be provided via a subscription service that is established between the IPTV servers and the social networking servers and the parameters governing the transfer of data could be governed, for example, by the terms of a service agreement or license. Some parameters may also be set by the user in some cases.

Returning to the pull case, the data mining requests typically can incorporate the use of specific tags that are consistent with protocols exposed by the API 202. In this way, the IPTV domain 200 can advantageously tap into content from the increasingly popular social media networks that can be implemented across a wide array of platforms and which can facilitate various communication and content-sharing services between the friends 225 and the IPTV user. For example, as described in more detail below, a user of the systems according to the present principles may conveniently browse and select from among media content that is posted by the user's friends. In alternative implementations where an API is not exposed by a social networking service, the extractor 224 may be configured to extract or read data from the service from human readable output in a process commonly known as data scraping.

The social networking feed 218 will typically include a link to media content (e.g., video, audio, images, etc.) as well as related metadata such as a graphical icon or thumbnail representation of the content, title, size/length, date, ratings, and the like. The proxy server 22 can follow the link and make a request to the content server 24 to thereby receive extracted media content 228. Alternatively, the proxy server will simply provide the URL or URI for the media content to the content playback device 12 or second display 14*i* so that those devices can access the extracted media content directly from the content server. In some cases, the social networking feed 218 may include extracted media content directly from the social networking server 212 as indicated by reference numeral 230 so that the proxy server does not need to access the extracted media content from a separate content server.

Figure 3:
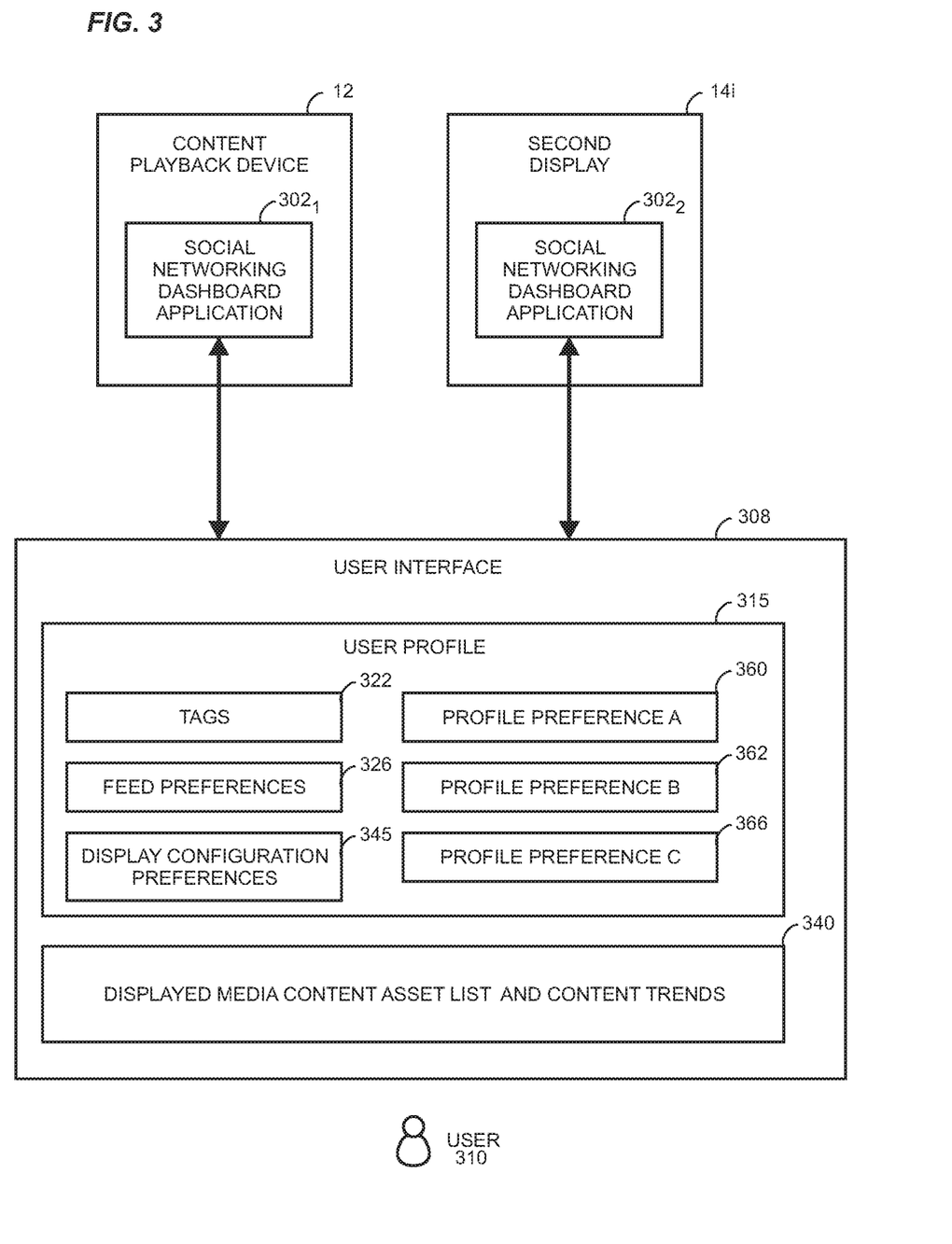
FIG. 3 is a block diagram illustrating user interface functionality supported by a social networking dashboard application according to an aspect of the present principles.

FIG. 3 shows a social networking dashboard application $302_1$ that is instantiated on the content playback device 12. An application $302_2$ having similar features and capabilities as application $302_1$ may also be optionally instantiated on the second display 14*i* in implementations where a second display is utilized. Each of the social networking dashboard applications 302 can be configured as a standalone application or a web-based application. Alternatively, the functionality provided in the social networking dashboard application may be incorporated, in some cases, into other applications that may be running in the IPTV environment. In addition, the social networking dashboard application 302 can be implemented using a cloud computing paradigm in which some application functionality is provided locally while other functionality is provided by operations conducted on a remote server.

In an alternative implementation, the social networking dashboard application may execute substantially remotely, for example on a server that may be operated in the IPTV domain 200 (FIG. 2). In such implementations, a user interface, and other functionality in some cases, will typically be provided on a client application that runs locally on the content playback device 12 and/or a second display 14*i*.

Each of these social networking dashboard applications 302 can be utilized to expose a UI 308 to an IPTV user 310. The UI 308 is arranged with various tools to enable the user 310 to populate a user profile 315. Each of the social networking dashboard applications 302 can be configured as a standalone application or the functionality provided therein may be incorporated, in some cases, into other applications that may be running in the IPTV environment. The user can typically interact with the UI 308 using an input device such as a keyboard, pointing device, remote control, or the second display 14*i* (FIG. 1).

The user profile 315 includes tags 322 and feed preferences 326 that are utilized by the extractor 224 (FIG. 2) when mining a monitored social networking feed to extract relevant media content. The user 310 can specify the tags 322 such as keywords, names of social network friends, media content types, content length (for audio and video for example), and the like that, when present in a particular feed, will trigger the extractor 224 to identify and extract the media content in that feed. The user profile 315 can also contain information pertaining to the user such as rating, language, character set, and the like. This user information may also function as the sole or supplemental criteria that may be utilized by the extractor 224 when identifying and extracting media content from the monitored social networking feed. The feed preferences 326 in the user profile 315 can be set by the user 310 to establish the frequency at which media content is extracted. For example the user 310 may specify how often a feed is checked for updates that may include new media content.

When the extractor 224 is triggered to begin the extraction process, it will generate a media content asset. In one implementation, the media content asset is expressed in an XML format, however other known metafile formats such as m3u, m3u8, JSON (JavaScript Object Notation), and the like, may also be utilized. The media content asset will typically include a link (e.g. a URL) to the extracted content and metadata that is associated with the media content. The metadata can include various types of data including a thumbnail image or icon of the media content, content title, content size/length, date, user ratings, and the like. Typically, multiple instances of media content assets will be generated by the extractor 224 and then provided to the social networking dashboard application 302 via a network connection.

The social networking dashboard application 302 will receive the media content assets in the XML format and responsively create a media content asset list that is displayed on the UI 308 as indicated by reference numeral 340. The displayed media content asset list can be user-configurable using a display configuration functionality 345 so that the particular graphical layout of the media content assets may be tailored to the user's preferences.

Figure 4:
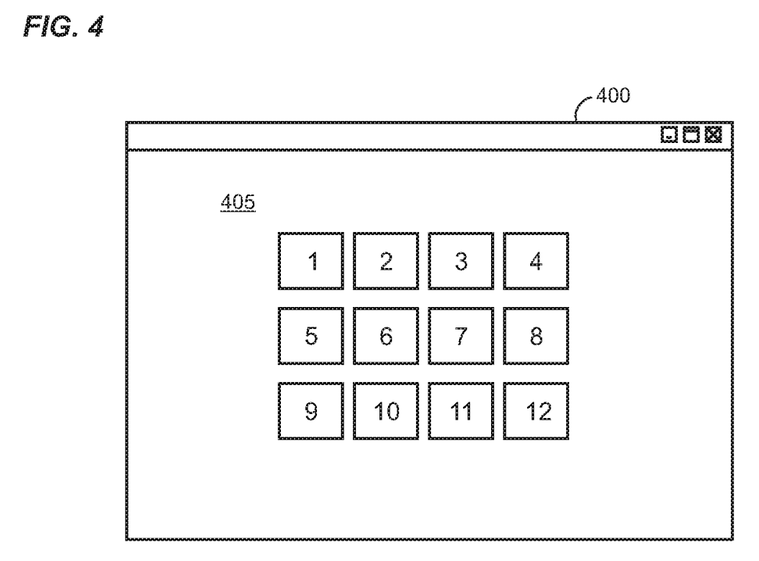
FIGS. 4, 5, and 6 show illustrative windows displaying thumbnails of media content extracted from social networking feeds according to an aspect of the present principles.

For example, as shown in FIG. 4, a mesh layout may be selected by the user in which thumbnails for each piece of media content are collectively displayed in a mosaic pattern in a display window 400 supported by the social networking dashboard application UI 308 (FIG. 3). In this example, 12 pieces of media content are displayed in the window 400 using thumbnails 405 (where graphical details of the thumbnails are omitted for the sake of clarity and each thumbnail is numbered). However, various alternative layouts can also be provided to the user for selection.

Figure 5:
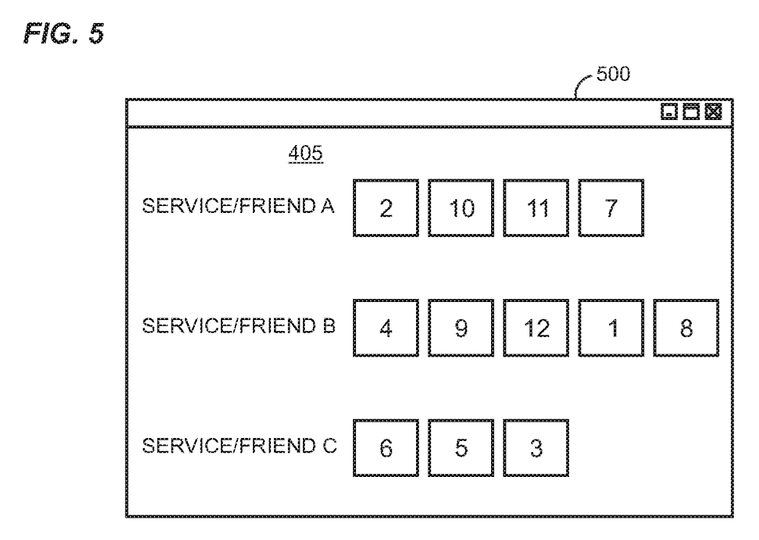

For example, FIG. 5 shows a window 500 in which the thumbnails 405 are arranged in a grid-based layout. Here, the media content assets are arranged by networking service provider and/or friend. In this example, the feed associated with service A, or friend A, has four pieces of media content (items 2, 10, 11, and 7) that were extracted according to the tags 322 (FIG. 3) specified by the user. The feed associated with service B, or friend B, has five pieces of media content (items 4, 9, 12, 1, and 8) that were extracted according to the tags 322 specified by the user. The feed associated with service C, or friend C, has three pieces of media content (items 6, 5, and 3) that were extracted according to the tags 322 specified by the user. It will be recognized that other layouts may also be utilized including lists, categorized media content (by type, length, ratings, etc.), and meshes. The number and type of alternative layouts that are available for selection by the user can vary by implementation. In addition, the identity of particular friends or services that are the sources of the media content assets can be hidden from the user in some cases.

In one illustrative example, the media content can be presented to the user in a prioritized manner, for example, by indicating the priority of the service or friend from high to low. Such priority indication may be implicitly provided, for example, by the position of the service/friend or associated media content in the window, or explicitly provided via text or a graphic object in the window. The XML file will typically include the relevant code which the social networking dashboard application UI can use to format the arrangement of the extracted media content assets by service/friend with the appropriate priority.

The IPTV domain service can determine priority by analyzing various communications between the IPTV user and the user's friends (noting again that friends can include subscriptions, affiliations, groups, events, and the like). For example, if two of the user's friends A and B watch the same piece of media content (and that media content meets the various criteria to be extracted), then friend A will be given priority over friend B if friend A has more communications with the user than friend B. Such communications could include messages, photographs tagged by the user on the friends' social networking page (and vice versa), and the like. As shown in FIG. 5, the priority of friend A may be implicitly indicated by placing the media content thumbnails associated with friend A at the top of the window 500 and over those thumbnails associated with friend B.

Referring again to FIG. 3, the UI 308 also exposes functionalities by which the user can specify user profile preferences. In this particular example, three profile preferences A, B, and C are utilized as respectively indicated by reference numerals 360, 362, and 366. Such preferences can include, for example, context, subjects, ideas, topics, keywords, genres, and the like. It is emphasized that while three profile preferences are utilized in this particular example, fewer than three profile preferences can be used in some implementations. Likewise, more than three profile preferences can be used in order to meet the needs of a particular implementation.

In one embodiment, the user profile preferences are configured in a hierarchical arrangement so that profile preference A is the primary preference, preference B is a secondary preference, and preference C is a tertiary preference. In this arrangement, the primary preference can variously include context, keywords, topics, concepts, subject, genre, etc. One example of a primary preference keyword is "3D" which is a common abbreviation for three-dimensional. The secondary preference can variously include context and keywords, etc. that are related to the primary preference. An example of a secondary preference would be "3D with $4^{th}$ D" since the concept of a fourth dimension (which may relate to sensory effects such as motion) is related to the 3D keyword. The tertiary preference, in this example, includes the primary preferences belonging to the user's social networking friends.

Using the profile preferences 360, 362, and 366, the extractor 224 (FIG. 2) can monitor the social networking feeds and extract media content for presentation as one or more media content trends to the user through the user interface 308 (FIG. 3 and element 340). Typically, the monitoring and extraction is performed regularly so that the trends can be created using media content that is extracted substantially in real-time with the posting of the content to the social networking site.

Figure 6:
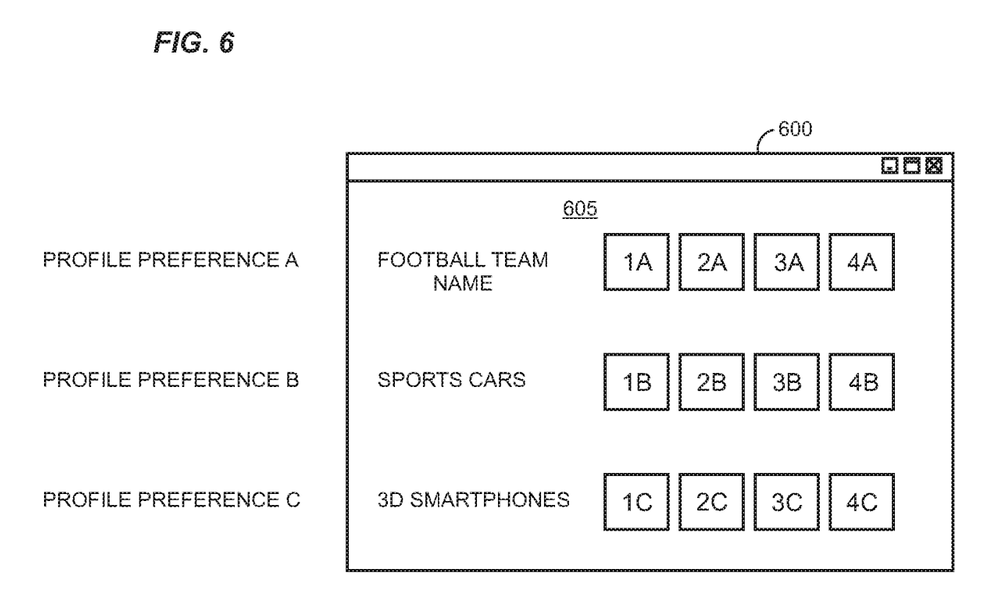
Figure 7:
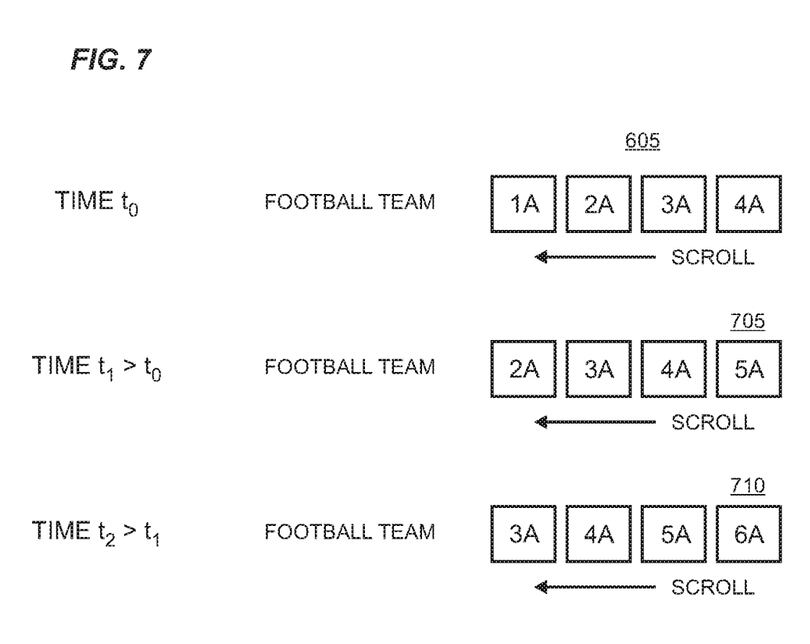
FIG. 7 illustrates one exemplary method of displaying media content trends according to an aspect of the present principles.

Elaborating on the example provided in the Summary section above, FIG. 6 shows a window 600 supported by the social dashboard application UI 308 (FIG. 3). In this example, 12 pieces of media content are displayed in the window 600, using thumbnails 605, and categorized by profile preference. The profile preferences include the keywords as shown. FIG. 7 provides an illustrative example by which media content associated with the user's favorite football team is continuously updated with new content to indicate a trend to the user. At some arbitrary time $t_0$, the four pieces of media content are displayed as thumbnails 1A, 2A, 3A, and 4A. At a later time $t_1$, the thumbnails scroll from right to left as a new piece of media content represented by thumbnail 5A is displayed, as indicated by reference numeral 705. Thumbnail 5A represents media content pertaining to profile preference A that was recently posted by the user's friend to a social networking website and which is monitored as a feed. At another later time $t_2$, when another piece of media content that is relevant to the profile preference is extracted, the displayed thumbnails scroll again as thumbnail 6A is added to the right side of the display, as indicated by reference numeral 710.

Since the display window is typically updated in real-time or near real-time, the user can easily keep abreast of the trends associated with each of the user's profile preferences by watching the right side of the display for new media content. In some implementations, the social networking dashboard application can provide a visual or audio alert to indicate incoming new media content. In this example as noted above, media content item 4A represents a picture and comments posted by the user's friend to a monitored social networking site about a team member who just made a key play in a game. Media content item 5A represents a video about the team member posted by another friend, and media content item 6A is an audio file of fans cheering for the team posted by a third friend.

Figure 8:
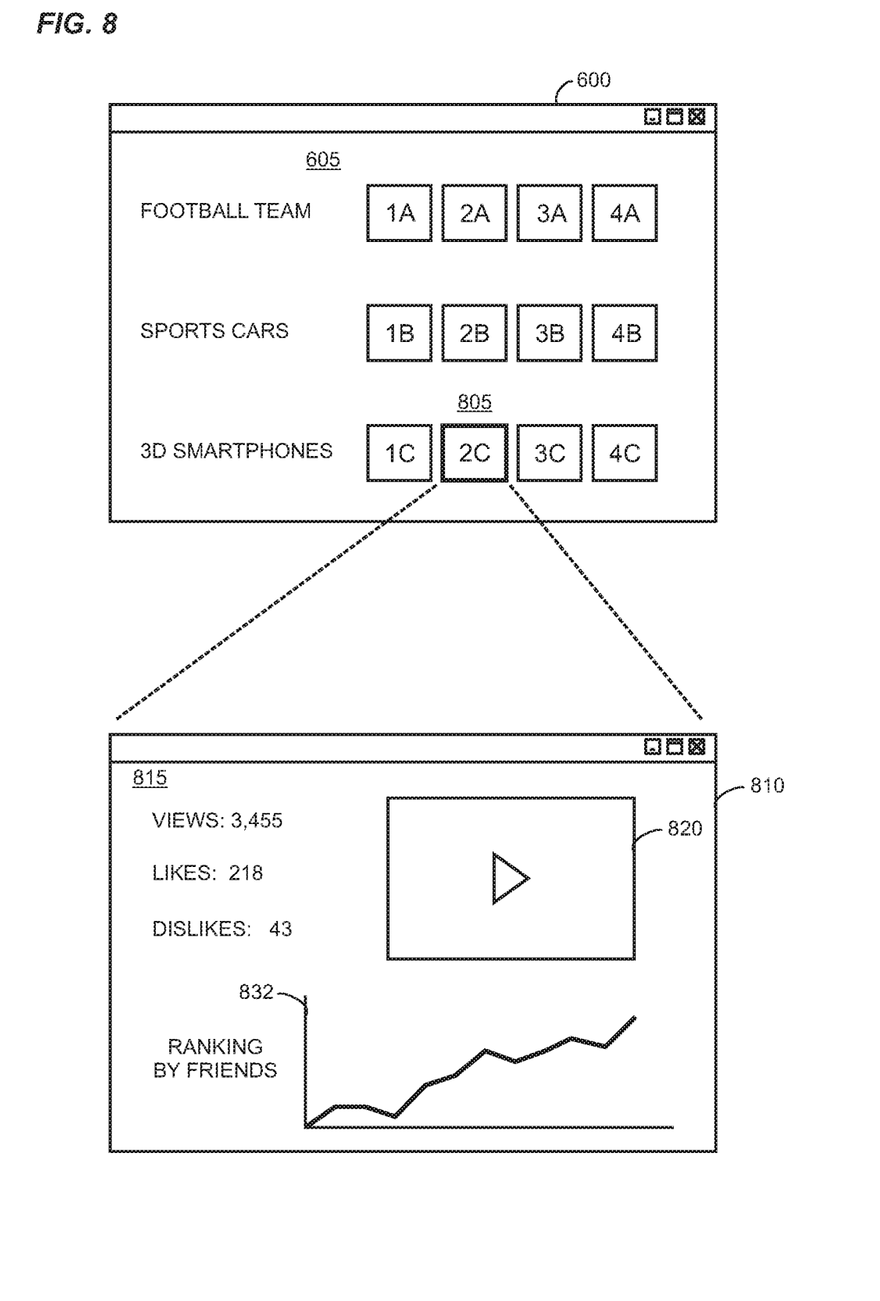
FIG. 8 illustrates one exemplary method of selecting media content for consumption according to an aspect of the present principles.

The user can browse the displayed thumbnails in a window and interact with the related media content by selecting a particular thumbnail using an input device. As shown in FIG. 8, when the user selects the media content thumbnail 2C, as indicated by reference numeral 805, another window 810 is opened. The window 810 exposes metadata 815 associated with the media content such as total views and the number of likes and dislikes, as well as a control 820 to launch to the media content itself so that the user can consume it on the IPTV. Window 810 may also include controls (not shown) for saving the media content for future local consumption or to forward the media content to another device or user.

FIG. 8 also shows an additional expression of trend information about this particular piece of media content. As shown, the trend information is displayed as a line graph 832 which plots popularity, in this case a ranking of the media content by the user's friends, over some arbitrary time interval. Other trend representations (not shown) can also be alternatively utilized including bar graphs, pie charts, and the like. The popularity of a given piece of media content may be determined in a variety of ways. For example, the IPTV service may track ratings or rankings of the media content by the user's friends, as expressed in the social networking feeds. The level of activity by the user's friends pertaining to media content may also be used to determine popularity. For example, a piece of media content may be identified by the service as being popular because a number of the user's friends are making comments about it.

In one illustrative example, trend information can be generated which expresses a degree of popularity of a particular aspect of media content. For example, the aspect may be keywords contained in social networking feeds that commonly pertain to multiple pieces of media content. Thus, if several of the user's friends each commented on different videos about penguins, the keyword "penguins" could be included as part of a popularity trend even if no single video would otherwise be determined as being popular.

Figure 9:
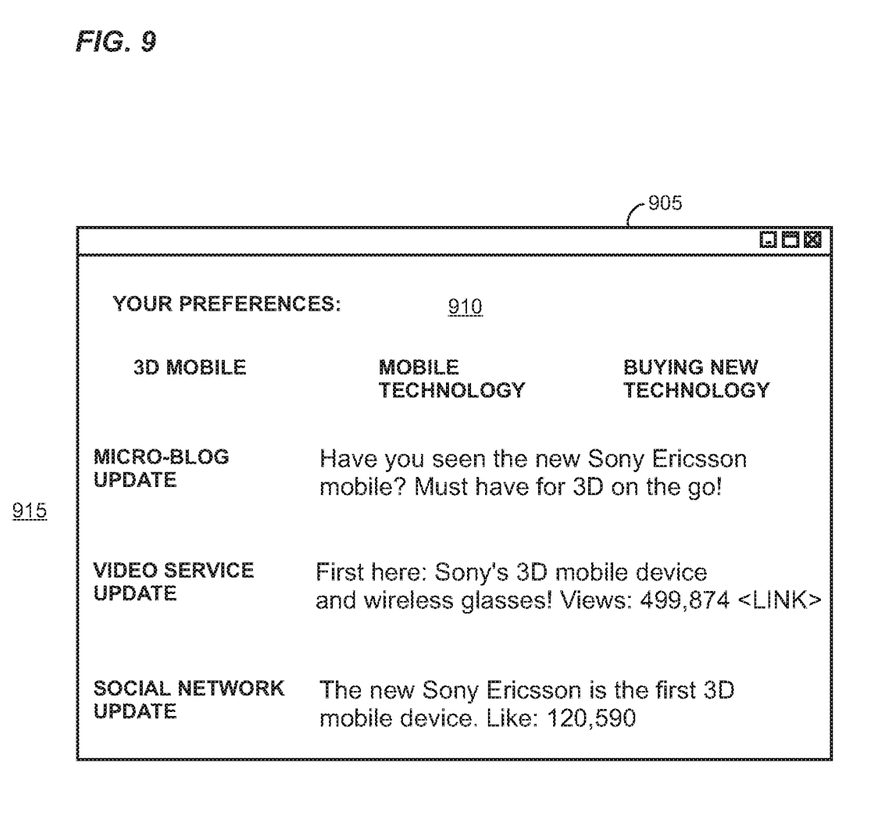
FIG. 9 shows an illustrative window displaying media content trends in accordance with another aspect of the present principles.

FIG. 9 shows an illustrative window 905 that includes an alternative method for displaying trends. In this example, the user's three profile preferences 910 include keywords relating to mobile technology, as shown. Feeds associated with three social networking services 915 including a micro-blog service, a video service, and a social network service, are monitored for updates. The most recent updates are displayed at any given time and as new media content is posted to a respective service, additional updates are displayed in real-time in many cases, or near real-time in others.

Figure 10:
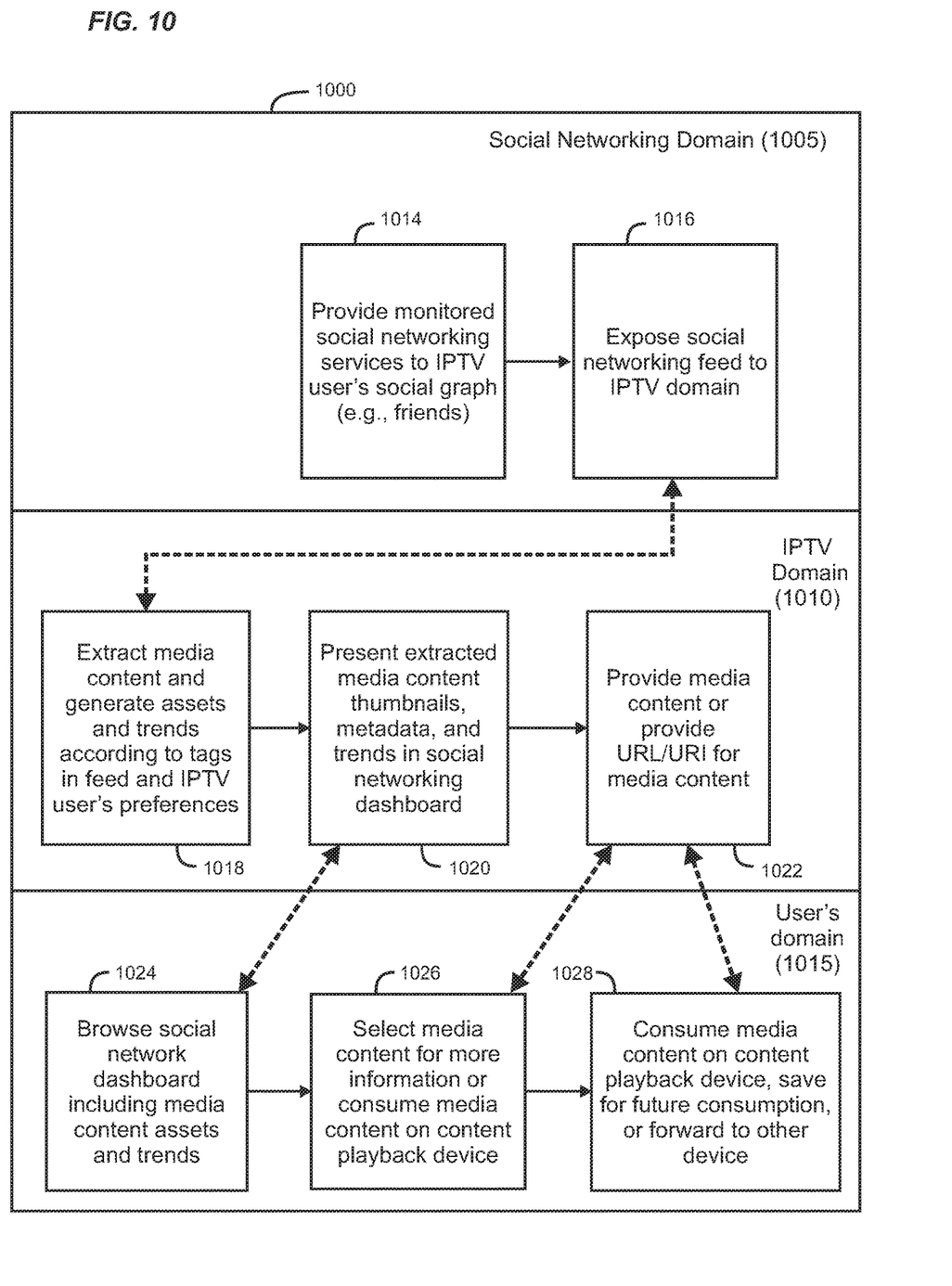
FIG. 10 is a flowchart illustrating an exemplary method according to an aspect of the present principles.

FIG. 10 is a flowchart illustrating an exemplary method 1000 by which software instantiated and executed in various ones of a social networking domain 1005, IPTV domain 1010, and IPTV user's domain 1015 is employed to enable the user to browse and select media content, and view media content trends that are generated from feeds exposed by the social networking server 212 (FIG. 2). In the social networking domain 1005, a first step is providing monitored social networking services to the user's friends (step 1014). In some implementations, the user can interact with functionality exposed to the social networking dashboard application (or by a service supported in the IPTV domain) in order for the user to set up subscriptions for the feeds that are established and monitored for particular friends.

The monitored social networking feeds are then exposed to the servers in the IPTV domain 1010 typically through an API (step 1016). A next step is for the servers in the IPTV domain to extract media content and generate media content assets and trends according to tags in the feed and the user's preference profiles (step 1018). The extracted media content can be presented in the form of thumbnails with associated metadata in some cases, along with trends using the UI exposed by the social networking application dashboard (step 1020). As noted above, the presentation of the media content assets lists may be user-configurable in some implementations.

In the user's domain 1015, the user can browse the media content asset lists (step 1024). The user can select from the thumbnails to learn additional information through the exposed metadata and/or consume the media content via playback on the content playback device (step 1026). Control is then passed back to the IPTV domain so that the selected media content can be served from an IPTV domain server or a URL/URI may be provided so that the content playback device or second display can access the media content directly from the content server (step 1022). The selected media content can then be consumed on the content playback device, saved for future consumption, or forwarded to another device (step 1028).

Aspects of various components are described below.

Figure 11:
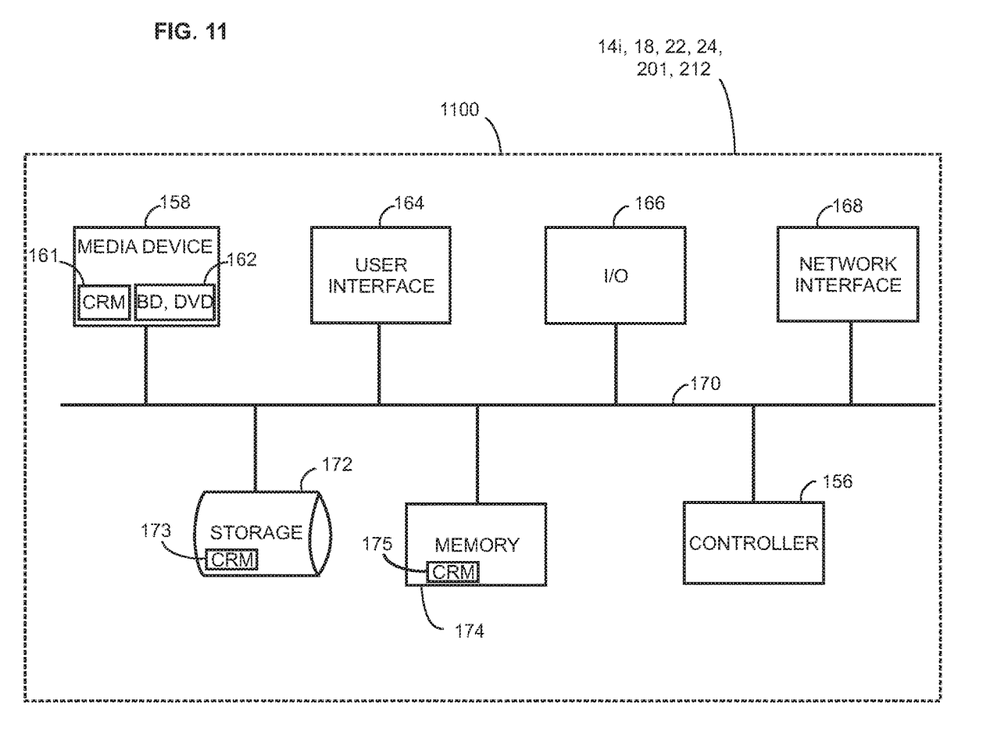
FIG. 11 illustrates an exemplary computing device, e.g., that of the disclosed second display, proxy server, management server, content server, web server, computing device, or social network server.

One implementation includes one or more programmable processors and corresponding computing system components to store and execute computer instructions, such as to execute the code that provides the second display or various server functionality, as well as for browsing. Referring to FIG. 11, a representation of such an exemplary computing device 1100 for a second display 14$i$, proxy server 22, management server 18, content server 24, web server 201, or social network server 212, is illustrated.

The computing device includes a controller 156, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 156 includes a programmable processor and controls the operation of the computing device and its components. The controller 156 loads instructions from the memory 174 or an embedded controller memory (not shown) and executes these instructions to control the system. In its execution, the controller 156 may provide, for example, the second display 14i control of a content playback device system 12 as, in part, a software system. Alternatively, this service can be implemented as separate modular components in the controller 156 or the second display 14i.

Memory 174, which may include non-transitory computer-readable memory 175, stores data temporarily for use by the other components of the computing device 1100. In one implementation, memory 174 is implemented as RAM (Random Access Memory). In other implementations, memory 174 also includes long-term or permanent memory, such as flash memory and/or ROM (Read-only Memory).

Storage 172, which may include non-transitory computer-readable memory 173, stores data temporarily or long-term for use by other components of the computing device 1100 such as for storing data used by the system. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-ray® disc drive 162.

The user interface 164 includes components for accepting user input, e.g., the user content selections, from the user of the computing device 1100 and presenting information to the user. In one implementation, the user interface 164 includes a keyboard, a mouse, audio speakers, and a display. The controller 156 uses input from the user to adjust the operation of the computing device 1100.

The I/O interface 166 includes one or more I/O ports to connect to corresponding I/O devices, such as external storage or supplemental devices, e.g., a printer or a PDA. In one implementation, the ports of the I/O interface 166 include ports such as: USB (Universal Serial Bus) ports, PCMCIA (Personal Computer Memory Card International Association) ports, serial ports, and/or parallel ports. In another implementation, the I/O (Input/Output) interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, or the like.

The computing device 1100 may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention.

Accordingly, the present invention is not limited to only those implementations described above.

The invention claimed is:

1. A method for providing media content to a media content playback device associated with a user, comprising:
monitoring one or more social networking feeds to identify media content items that conform with user-defined criteria, the user-defined criteria including at least one of tags or profile preferences;
extracting identification of media content from the monitored social networking feeds when objects in the social networking feed conform to the at least one of tags or profile preferences;
sending the extracted identification as at least a portion of a media content asset to a device for display to a user;
providing data to the device for display so that a plurality of media content assets are shown, the assets pertaining to objects in the feed that conform to the at least one of tags or profile preferences; and
responsively to user selection of a displayed media content asset, causing the selected media content to be delivered to the device for consumption or storage.

2. The method of claim 1, wherein the causing includes retrieving the selected media content from a content server or social networking server and transmitting the retrieved media content to the device.

3. The method of claim 1, wherein the causing includes causing the device to download the selected media content from a content server via a supplied URL/URI.

4. The method of claim 1, wherein the at least one of the profile preferences are arranged hierarchically and at least one of the profile preferences is related to a second profile preference via context or keyword.

5. The method of claim 1, wherein the monitored social networking feeds are associated with various ones of the user's social graph, the social graph including one or more of friends, relatives, subscriptions, affiliations, groups, events, or co-workers.

6. The method of claim 1, wherein the monitored feeds are selected according to a user subscription.

7. The method of claim 1, wherein the extraction is performed via interaction with an API exposed by a server operated on behalf of a social networking service provider.

8. The method of claim 1, wherein the media content asset is expressed using XML.

9. The method of claim 1, wherein the extracting is performed at the social networking server, and wherein the sending step is performed by pushing the extracted identification as at least a portion of a media content asset to a device for display to a user.

10. The method of claim 1, wherein the extracted identification includes at least metadata related to the media content.

11. The method of claim 1, wherein the extracting identification includes interacting with an API exposed by a server operated on behalf of a social networking service provider.

12. One or more non-transitory computer-readable storage media containing instructions which, when executed by one or more processors disposed in an electronic device, implement a social network dashboard application user interface performing a method comprising:

supporting functionality through the user interface for receiving input from an application user that is indicative of user criteria for extracting media content from one or more social networking feeds, the user criteria including at least one of tags or profile preferences;

providing the user criteria to a service that extracts media content from the one or more social networking feeds when the criteria are met;

receiving a plurality of media content assets from the service, the plurality corresponding to the extracted media content, the media content assets including identification of the media content and related metadata; and displaying the plurality of media content assets to the user.

13. The one or more non-transitory computer-readable storage media of claim 12, wherein the method further includes providing functionality through the user interface for receiving user input for controlling aspects of the display of the plurality of media content assets.

14. The one or more non-transitory computer-readable storage media of claim 13, wherein the controlling comprises selecting among alternative display arrangements for thumbnails that are representative of the media content, the arrangement including mosaic, mesh, grid, categorization, and list.

15. The one or more non-transitory computer-readable storage media of claim 12, wherein the method further includes providing functionality through the user interface for receiving an indication from the user of a selection of a piece of media content and displaying the metadata associated with the selected piece of media content or causing the selected piece of media content to play back on a content playback device responsively to the indication.

16. The method of claim 12, wherein the extracted identification includes at least metadata related to the media content.

17. The method of claim 12, wherein the extracting identification includes interacting with an API exposed by a server operated on behalf of a social networking service provider.

\* \* \* \* \*